United States Patent [19]

Engel et al.

[11] 4,347,524

[45] Aug. 31, 1982

[54] APPARATUS FOR ABSORBING SHOCKS TO THE INK SUPPLY OF AN INK JET PRINTER

[75] Inventors: Pedro F. Engel, Fort Collins; Phillip A. McCollum, Loveland, both of Colo.

[73] Assignee: Hewlett-Packard Company, Palo Alto, Calif.

[21] Appl. No.: 175,991

[22] Filed: Aug. 7, 1980

[51] Int. Cl.³ .............................................. G01D 15/18
[52] U.S. Cl. .............................................. 346/140 R
[58] Field of Search ................................ 346/140 PD

[56] References Cited

U.S. PATENT DOCUMENTS

| | | | |
|---|---|---|---|
| 3,708,798 | 1/1973 | Hildenbrand et al. | 346/140 PD |
| 4,121,227 | 10/1978 | Fischbeck et al. | 346/140 PD |
| 4,124,853 | 11/1978 | Kattner et al. | 346/140 PD |

*Primary Examiner*—George H. Miller, Jr.
*Attorney, Agent, or Firm*—Douglas A. Kundrat

[57] ABSTRACT

A piezoelectrically driven ink jet printer includes a shock absorbing mechanism positioned in the ink supply tube for minimizing the effects on the ink within the print head of physical shocks to the ink supply tube or ink supply cartridge. The shock absorbing mechanism includes a flow restriction device and a reservoir device arranged such that the physical performance of the shock absorbing mechanism is analogous to the electrical performance of an RC low pass filter.

4 Claims, 2 Drawing Figures

APPARATUS FOR ABSORBING SHOCKS TO THE INK SUPPLY OF AN INK JET PRINTER

BACKGROUND OF THE INVENTION

The present invention relates generally to ink jet printers and more specifically to piezoelectrically driven print heads for applying ink droplets on demand to a writing surface. Exemplary of such print heads is that described in U.S. Pat. No. 3,747,120, entitled Arrangement of Writing Mechanisms for Writing on Paper with a Colored Liquid. This and other prior art relating to ink jet printers fails to recognize the need for protecting the ink supply within the print head from the effects of physical shocks to the ink supply cartridge or the ink supply tube.

One undesirable effect of the lack of shock protection is the shock induced ingestion of air bubbles into the ink supply within the print head via the discharge channel. The presence of just a single air bubble in the ink supply within the print head seriously degrades performance of the print head. Another undesirable effect of the lack of shock protection is the spurious and premature ejection of ink droplets from the print head in response to physical shocks to the ink supply cartridge or the ink supply tube.

Attempts have been made in the prior art to reduce these undesirable effects by positioning a flow restriction device in the ink supply tube to attenuate shock pulses travelling down the ink supply tube to the print head. Although this solution has been somewhat successful in attenuating shock pulses and their effects, it has the major disadvantage of causing a restriction in the normal flow of ink proportional to the amount of attenuation of the shock pulse.

The pressure pulse travelling through the ink supply tube may be viewed as the sum of a mathematical series of sinusoidal pressure variations within the ink while the normal ink flow may be viewed as a non-varying, or DC, term. It would, therefore, be advantageous to employ a frequency dependent shock absorbing apparatus capable of causing a high degree of attenuation of the time-varying components of the shock pulse while causing only a minimal attenuation of the DC valued normal ink flow term.

SUMMARY OF THE INVENTION

The present invention is directed to a shock absorbing apparatus positioned in the ink supply tube of an ink jet printer to protect the print head from the effects of physical shocks applied to the ink supply cartridge or ink supply tube. In accordance with the illustrated preferred embodiments of the present invention, the shock absorbing apparatus includes a restriction device and a reservoir device positioned along the ink supply tube.

The prior art solution of using a restriction device alone is analogous to an electrical series resistor attenuator and attenuates all components of the shock pulse and normal ink flow equally regardless of frequency. The present invention is advantageous over the prior art because it performs as a mechanical low pass filter analogous to an electrical RC network. Thus, the present invention provides attenuation that increases as frequency increases with the result that the degree of restriction of the normal ink flow can be made arbitrarily small while the attenuation of the shock pulse can, at the same time, be made much greater.

DESCRIPTION OF THE PREFERRED EMBODIMENT

Figure 1:
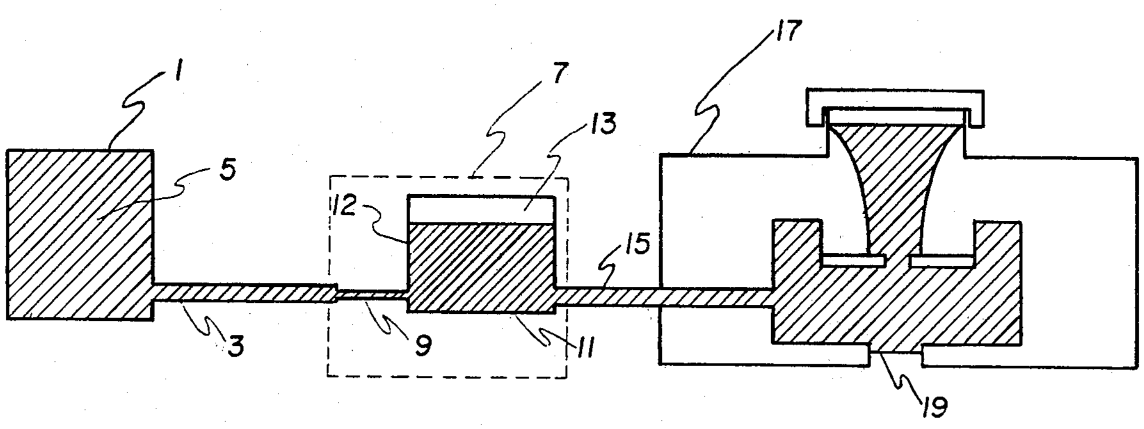
FIG. 1 is a cross-sectional block diagram of an ink jet printer that includes a shock absorbing apparatus in accordance with one embodiment of the present invention.

Referring now to FIG. 1, there is shown an ink jet printer including a print head 17 of the type described in U.S. Pat. No. 3,747,120. The ink jet printer includes an ink supply cartridge 1 connected to a shock absorbing apparatus 7 by an ink supply tube 3. A supply tube 15 connects the shock absorbing apparatus 7 to the print head 17. The way in which print head 17 operates to eject ink droplets through a discharge channel 19 may be understood with reference to U.S. Pat. No. 3,747,120.

The shock absorbing apparatus 7 depicted in FIG. 1 comprises a restriction device 9 and an air-type reservoir 11. The restriction device 9 may simply comprise a length of tube having a diameter smaller than that of the ink supply tube 3. The air-type reservoir 11 comprises a chamber 12 that is partially filled with ink 5 and partially filled with air 13.

Figure 2:
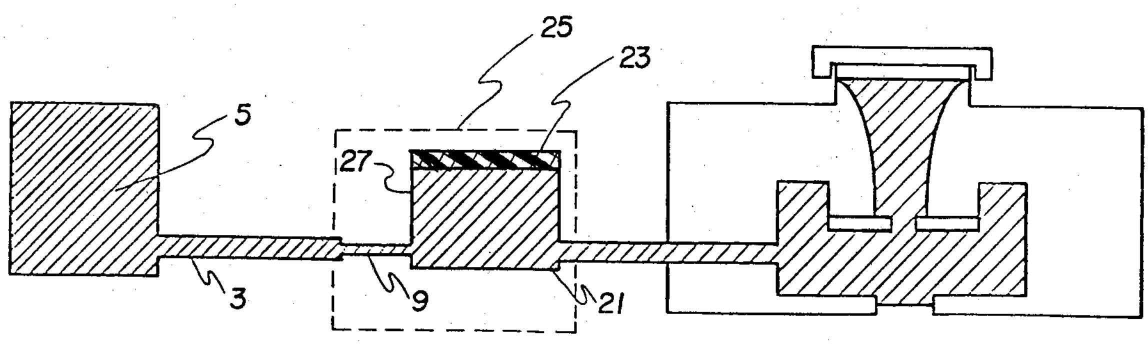
FIG. 2 is a cross-sectional block diagram of an ink jet printer that includes a shock absorbing apparatus in accordance with another embodiment of the present invention.

Referring now to FIG. 2, there is shown an ink jet printer in which the shock absorbing apparatus is constructed in accordance with another embodiment of the present invention. In this embodiment, the shock absorbing apparatus 25 comprises a restriction device 9 and a diaphragm-type reservoir device 21. As in the embodiment of FIG. 1, the restriction device 9 comprises a length of tube having a diameter smaller than that of ink supply tube 3. The diaphragm-type reservoir device 21 comprises a chamber 27 that is completely filled with ink 5 and includes a flexible diaphragm wall 23.

The operation of the present invention may be understood by analogy to an electrical series-resistor, shunt-capacitor RC network. The restriction device corresponds to the series resistor and the reservoir device corresponds to the shunt capacitor. In the absence of a shock pulse, the only ink motion within the ink supply tube is the normal flow of ink to the print head. The restriction device acts to restrict this normal flow while the reservoir device has no appreciable effect upon the normal ink flow.

When a physical shock is applied to the ink supply cartridge or ink supply tube a pressure pulse is propagated through the ink within the ink supply tube. The pulse is restricted and attenuated by the restriction device in the same manner as is the normal ink flow. When the pulse reaches the reservoir device it is contained therein instead of propagating through the reservoir device as does the normal ink flow. Within the air-type reservoir device of FIG. 1 the pulse causes more ink to enter the chamber than can be immediately exhausted and the air therein is compressed into a smaller volume. Within the diaphragm-type reservoir device of FIG. 2 the pulse causes more ink to enter the chamber than can be immediately exhausted and the diaphragm wall is displaced to allow containment of the increased volume of ink.

Design of shock absorbing apparatus in accordance with either of the illustrated preferred embodiments of the present invention may readily be accomplished with reference to an analogous electrical RC low pass filter. The maximum allowable restriction of the normal ink flow can be determined from the characteristics of the ink jet printer and the physical design of the restriction device may then be accomplished. Once the pulse attenuation characteristics and the ink jet printer requirements are known, the low pass filter cut-off frequency required to achieve adequate pulse attenuation may next be determined. Persons skilled in the art may then utilize the equations that define the analogous electrical RC network to determine the required capacity and physical parameters of the reservoir device.

We claim:

1. Apparatus for absorbing physical shock pulses travelling through the ink within an ink supply tube connecting an ink supply cartridge and a print head of an ink jet printer, the apparatus comprising:

restriction means positioned along the ink supply tube for restricting the flow of the ink through the ink supply tube; and reservoir means having an input for receiving ink from the restriction means and having an output connected to the print head.

2. Apparatus as in claim 1, wherein the restriction means comprises a length of tube having a diameter less than the diameter of the ink supply tube.

3. Apparatus as in claims 1 or 2, wherein the reservoir means comprises a chamber partially filled with ink and partially filled with air.

4. Apparatus as in claims 1 or 2, wherein the reservoir means comprises an ink-filled chamber having a flexible wall.

* * * * *